(12) United States Patent
Kato et al.

(10) Patent No.: US 10,731,994 B2
(45) Date of Patent: Aug. 4, 2020

(54) INFORMATION PROCESSING DEVICE AND INFORMATION PROCESSING METHOD

(71) Applicant: SONY CORPORATION, Tokyo (JP)

(72) Inventors: Takaaki Kato, Tokyo (JP); Shingo Tsurumi, Saitama (JP); Masashi Eshima, Chiba (JP); Akihiko Kaino, Kanagawa (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 186 days.

(21) Appl. No.: 15/761,252

(22) PCT Filed: Sep. 16, 2016

(86) PCT No.: PCT/JP2016/077425
§ 371 (c)(1),
(2) Date: Mar. 19, 2018

(87) PCT Pub. No.: WO2017/057052
PCT Pub. Date: Jun. 4, 2017

(65) Prior Publication Data
US 2018/0266830 A1   Sep. 20, 2018

(30) Foreign Application Priority Data

Sep. 30, 2015   (JP) ................................ 2015-194553

(51) Int. Cl.
*G01C 21/28*  (2006.01)
*G06T 7/521*  (2017.01)
(Continued)

(52) U.S. Cl.
CPC ............ *G01C 21/28* (2013.01); *G01B 11/026* (2013.01); *G01C 3/08* (2013.01); *G01C 3/14* (2013.01);
(Continued)

(58) Field of Classification Search
CPC . G01C 21/28; G01C 3/14; G01C 3/08; H04N 13/239; H04N 5/232; H04N 5/2256;
(Continued)

(56) References Cited

U.S. PATENT DOCUMENTS 6,041,274 A    3/2000  Onishi et al.
2004/0088080 A1*  5/2004  Song ...................... A47L 9/009
                                                                        700/259
(Continued)

FOREIGN PATENT DOCUMENTS

CN           1493246 A       5/2004
DE          10313309 A1      5/2004
(Continued)

OTHER PUBLICATIONS

Machine Translation of JP 2015-158417 retrieved from espacenet on Nov. 25, 2019. (Year: 2019).*

(Continued)

*Primary Examiner* — Thomas Ingram
(74) *Attorney, Agent, or Firm* — Chip Law Group

(57) ABSTRACT

The present disclosure relates to an information processing device and an information processing method that are capable of estimating the self-position by accurately and continuously estimating the self-movement. The information processing device according to an aspect of the present disclosure includes a downward imaging section and a movement estimation section. The downward imaging section is disposed on the bottom of a moving object traveling on a road surface and captures an image of the road surface. The movement estimation section estimates the movement of the moving object in accordance with a plurality of images representing the road surface and captured at different time points by the downward imaging section. The
(Continued)

present disclosure can be applied, for example, to a position sensor mounted in an automobile.

11 Claims, 14 Drawing Sheets

(51) Int. Cl.

| | |
|---|---|
| *G01C 3/14* | (2006.01) |
| *G06T 7/246* | (2017.01) |
| *G06T 7/593* | (2017.01) |
| *H04N 5/32* | (2006.01) |
| *G01B 11/02* | (2006.01) |
| *H04N 13/239* | (2018.01) |
| *H04N 13/296* | (2018.01) |
| *G01C 3/08* | (2006.01) |
| *G06K 9/00* | (2006.01) |
| *G06K 9/62* | (2006.01) |
| *H04N 5/225* | (2006.01) |
| *G01B 11/25* | (2006.01) |
| *H04N 13/00* | (2018.01) |
| *H04N 5/232* | (2006.01) |

(52) U.S. Cl.
CPC ....... *G06K 9/00791* (2013.01); *G06K 9/6288* (2013.01); *G06T 7/246* (2017.01); *G06T 7/521* (2017.01); *G06T 7/593* (2017.01); *H04N 5/2256* (2013.01); *H04N 5/232* (2013.01); *H04N 13/239* (2018.05); *H04N 13/296* (2018.05); *G01B 11/2545* (2013.01); *G06K 2209/401* (2013.01); *G06T 2207/10021* (2013.01); *G06T 2207/10028* (2013.01); *G06T 2207/30244* (2013.01); *G06T 2207/30256* (2013.01); *H04N 2013/0085* (2013.01)

(58) Field of Classification Search
CPC ......... H04N 13/296; H04N 2013/0085; G01B 11/026; G01B 11/2545; G06T 7/593; G06T 7/246; G06T 7/521; G06T 2207/30256; G06T 2207/30244; G06T 2207/10021; G06T 2207/10028; G06K 9/6288; G06K 9/00791; G06K 2209/401
See application file for complete search history.

(56) References Cited

U.S. PATENT DOCUMENTS

2005/0234679 A1    10/2005  Karlsson
2017/0015317 A1 *   1/2017  Fasola .................. B60W 30/12

FOREIGN PATENT DOCUMENTS

| | | | |
|---|---|---|---|
| FR | 2846588 A1 | 5/2004 | |
| GB | 2394797 A | 5/2004 | |
| JP | 11-175147 A | 7/1999 | |
| JP | 2004-148088 A | 5/2004 | |
| JP | 2007-278951 A | 10/2007 | |
| JP | 2014-149209 A | 8/2014 | |
| JP | 2015-138530 A | 7/2015 | |
| JP | 2015-158417 A | 9/2015 | |
| KR | 10-2004-0039093 A | 5/2004 | |
| RU | 2242159 C1 | 12/2004 | |
| SE | 300964 A | 5/2004 | |
| WO | WO-2006087542 A1 * | 8/2006 | ........... G05D 1/0253 |

OTHER PUBLICATIONS

International Search Report and Written Opinion of PCT Application No. PCT/JP2016/077425, dated Oct. 18, 2016, 09 pages.

* cited by examiner

IMAGING RANGE

IMAGING RANGE

ADDED CAMERA POSITION

ADDED CAMERA POSITION

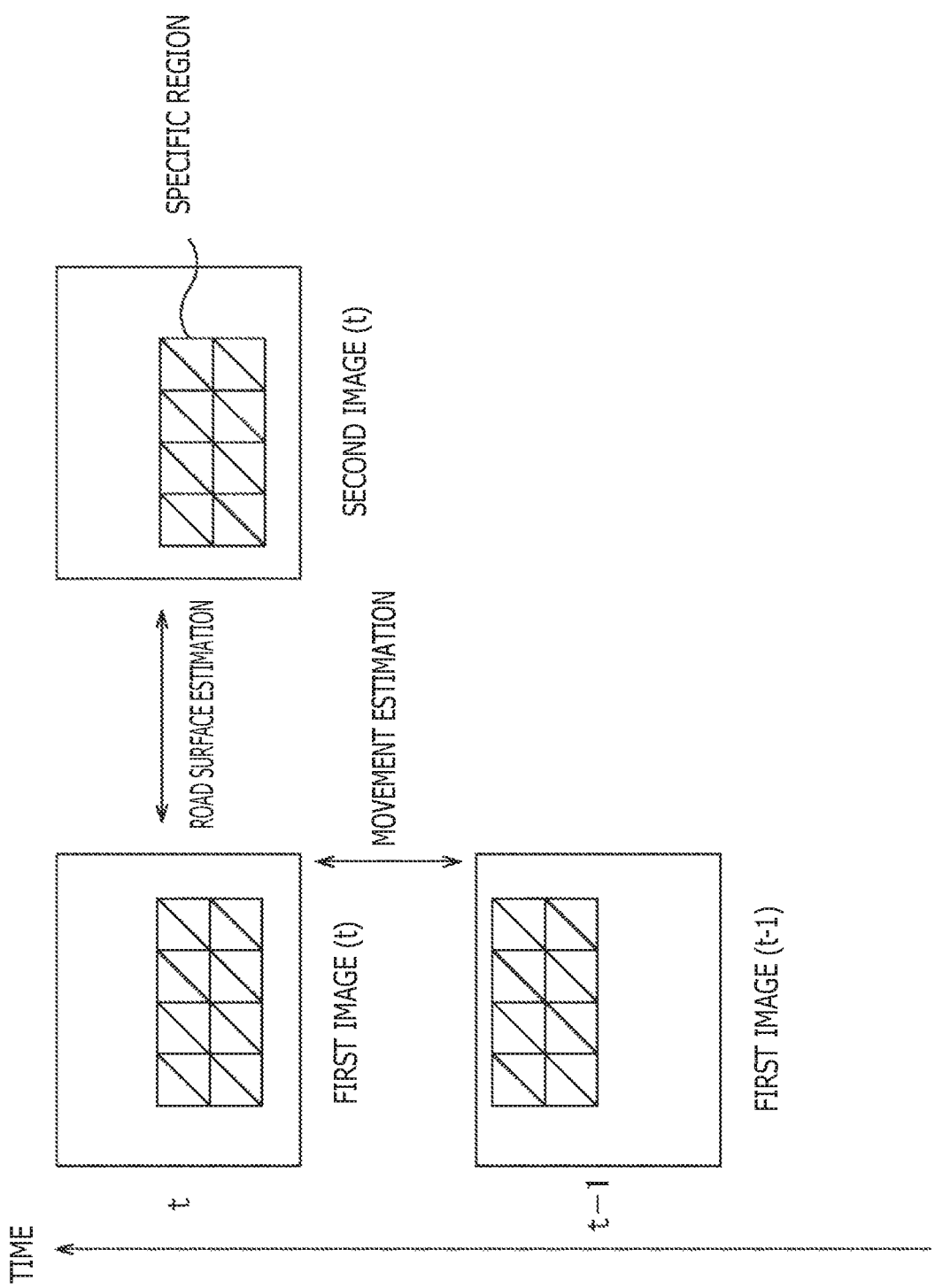
F I G. 6

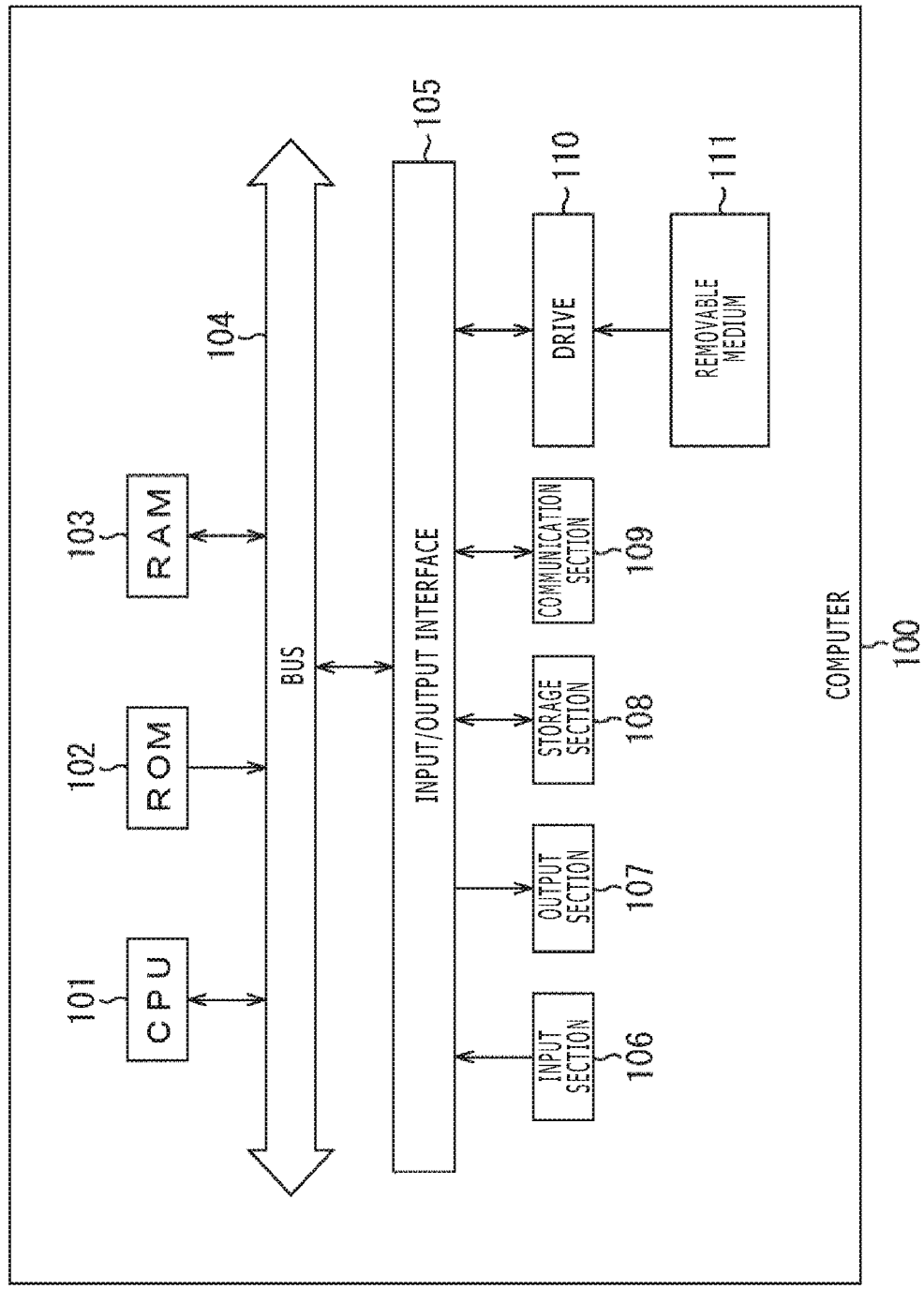

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/077425 filed on Sep. 16, 2016, which claims priority benefit of Japanese Patent Application No. JP 2015-194553 filed in the Japan Patent Office on Sep. 30, 2015. Each of the above-referenced applications is hereby incorporated herein by reference in its entirety.

TECHNICAL FIELD

The present disclosure relates to an information processing device, an information processing method, and a program, and more particularly to an information processing device, an information processing method, and a program that are suitable for estimating the position of the device mounted in an automobile or other moving object.

BACKGROUND ART

A GPS (Global Positioning System) is conventionally known as a scheme for estimating its position when mounted in an automobile or other moving object. According to the GPS, its position can be estimated when signals transmitted from a predetermined number of satellites are received. However, if, for example, the GPS is traveling near a high building or through a tunnel, the position of the GPS cannot be estimated because the above-mentioned signals cannot be received.

If such inconveniences are caused so that the position of a moving object cannot be estimated, the subsequent movement (the direction and speed of movement) of the moving object (e.g., an automobile) should be continuously detected with a known location at a certain time point defined as a reference point. More specifically, for example, a conceivable method is to mount a camera on the moving object, continuously capture an image of surroundings to obtain chronological images, and detect the movement of the moving object in accordance with the movement of a same subject in the chronological images.

However, if the employed method detects the movement of the moving object in accordance with the captured images of the surroundings, an inconvenience may arise. More specifically, the movement of the moving object cannot readily be continuously detected if the captured images show blown-out highlights due to ambient light, are mostly occupied by another moving object (e.g., a preceding large-sized automobile) that travels together with the own moving object, are unclear due to heavy rain or other bad weather, or merely show a distant view due to the absence of an appropriate nearby subject.

A method proposed to address the above problem is to detect the movement not by capturing the images of the surroundings of the moving object, but by tracking feature points on a road surface that are represented in chronological images obtained by continuously capturing the road surface (refer, for example, PTL 1 or 2).

Note that, in order to detect the movement by tracking feature points on a road surface, it is necessary to accurately measure the distance between the road surface and the camera (the height from the road surface to the camera). According to PTL 1, two laser pointers project reference marks onto a road surface in order to measure the road surface-to-camera distance in accordance with the distance between the reference marks. According to PTL 2, the road surface is irradiated with a light beam in a square lattice pattern in order to measure the road surface-to-camera distance in accordance with the distortion of the square lattice pattern.

CITATION LIST

Patent Literature

[PTL 1]
  JP 2014-149209A
[PTL 2]
  JP 2007-278951

SUMMARY

Technical Problem

The methods described in PTLs 1 and 2 assume that the road surface is completely flat. Therefore, on an actual road surface that may have a large number of slopes and surface irregularities, the road surface-to-camera distance cannot be accurately measured. As a result, the direction and speed of movement of the own moving object cannot be continuously detected with high accuracy.

The present disclosure has been made in view of the above circumstances and is capable of accurately and continuously estimating the movement (the direction and speed of movement) of the own moving object.

Solution to Problem

An information processing device according to an aspect of the present disclosure includes a downward imaging section and a movement estimation section. The downward imaging section is disposed on the bottom of a moving object traveling on a road surface and captures an image of the road surface. The movement estimation section estimates the movement of the moving object in accordance with a plurality of images representing the road surface and captured at different time points by the downward imaging section.

The information processing device according to an aspect of the present disclosure may further include a road surface estimation section that estimates the distance to the road surface.

The downward imaging section may include stereo cameras. The road surface estimation section is capable of estimating the distance to the road surface in accordance with a pair of road surface images that are captured at the same time point by the stereo cameras.

The road surface estimation section may include a ToF sensor.

The information processing device according to an aspect of the present disclosure may further include a light projection section that projects a texture pattern onto the road surface. The road surface estimation section is capable of estimating the distance to the road surface in accordance with an image of the texture pattern projected onto the road surface imaged by the downward imaging section.

The light transmitting section may double as an illumination section that illuminates the imaging range of the downward imaging section.

The information processing device according to an aspect of the present disclosure may further include an illumination section that illuminates the imaging range of the downward imaging section.

The information processing device according to an aspect of the present disclosure may further include a first self-position estimation section. The first self-position estimation section estimates the self-position of the moving object in accordance with the movement of the moving object that is estimated by the movement estimation section.

The information processing device according to an aspect of the present disclosure may further include an outward imaging section and a second self-position estimation section. The outward imaging section is disposed in a moving object traveling on a road surface and captures an image of the surroundings of the moving object. The second self-position estimation section estimates the self-position of the moving object in accordance with the image of the surroundings of the moving object that is captured by the outward imaging section.

The information processing device according to an aspect of the present disclosure may further include a correction section. The correction section corrects a first self-position estimated by the first self-position estimation section by using a second self-position estimated by the second self-position estimation section.

The correction section is capable of performing weighted averaging of the first self-position estimated by the first self-position estimation section and the second self-position estimated by the second self-position estimation section.

The correction section is capable of adopting, in accordance with the vehicle speed of the moving object, the second self-position estimated by the second self-position estimation section instead of the first self-position estimated by the first self-position estimation section.

The correction section is capable of adopting, in accordance with the number of landmarks derived from the image of the road surface that is captured by the downward imaging section, the second self-position estimated by the second self-position estimation section instead of the first self-position estimated by the first self-position estimation section.

An information processing method according to an aspect of the present disclosure is used in an information processing device including a downward imaging section and a movement estimation section. The downward imaging section is disposed on the bottom of a moving object traveling on a road surface and captures an image of the road surface. The movement estimation section estimates the movement of the moving object in accordance with a plurality of images representing the road surface and captured at different time points by the downward imaging section. The information processing method includes an acquisition step of acquiring, by the movement estimation section, the image of the road surface that is captured by the downward imaging section, and a movement estimation step of estimating, by the movement estimation section, the movement of the moving object in accordance with a plurality of acquired images representing the road surface and captured at different time points.

A program according to an aspect of the present disclosure controls an information processing device including a downward imaging section and a movement estimation section. The downward imaging section is disposed on the bottom of a moving object traveling on a road surface and captures an image of the road surface. The movement estimation section estimates the movement of the moving object in accordance with a plurality of images representing the road surface and captured at different time points by the downward imaging section. The program causes a computer in the information processing device to perform a process including an acquisition step of acquiring the image of the road surface that is captured by the downward imaging section, and a movement estimation step of estimating the movement of the moving object in accordance with the plurality of acquired road surface images that are captured at different time points.

An aspect of the present disclosure captures an image of a road surface that is captured by a downward imaging section, and estimates the movement of a moving object in accordance with a plurality of road surface images captured at different time points.

Advantageous Effect of Invention

An aspect of the present disclosure is capable of accurately and continuously estimating the movement of an own moving object.

BRIEF DESCRIPTION OF DRAWINGS

FIG. 6 is a diagram illustrating an overview of road surface estimation and movement estimation based on a pixel gradient.

FIG. 15 is a block diagram illustrating an exemplary configuration of a general-purpose computer.

DESCRIPTION OF EMBODIMENT

The best mode for carrying out the present disclosure (hereinafter referred to as the embodiment) will now be described with reference to the accompanying drawings.

An information processing device according to the embodiment of the present disclosure is mounted in a moving object to estimate its position. Note that the embodiment described below assumes that the moving object is an automobile. However, the information processing device can also be mounted in various other moving objects including autonomous mobile robots and vehicles such as bicycles and motorcycles not only in an automobile.

Figure 1:
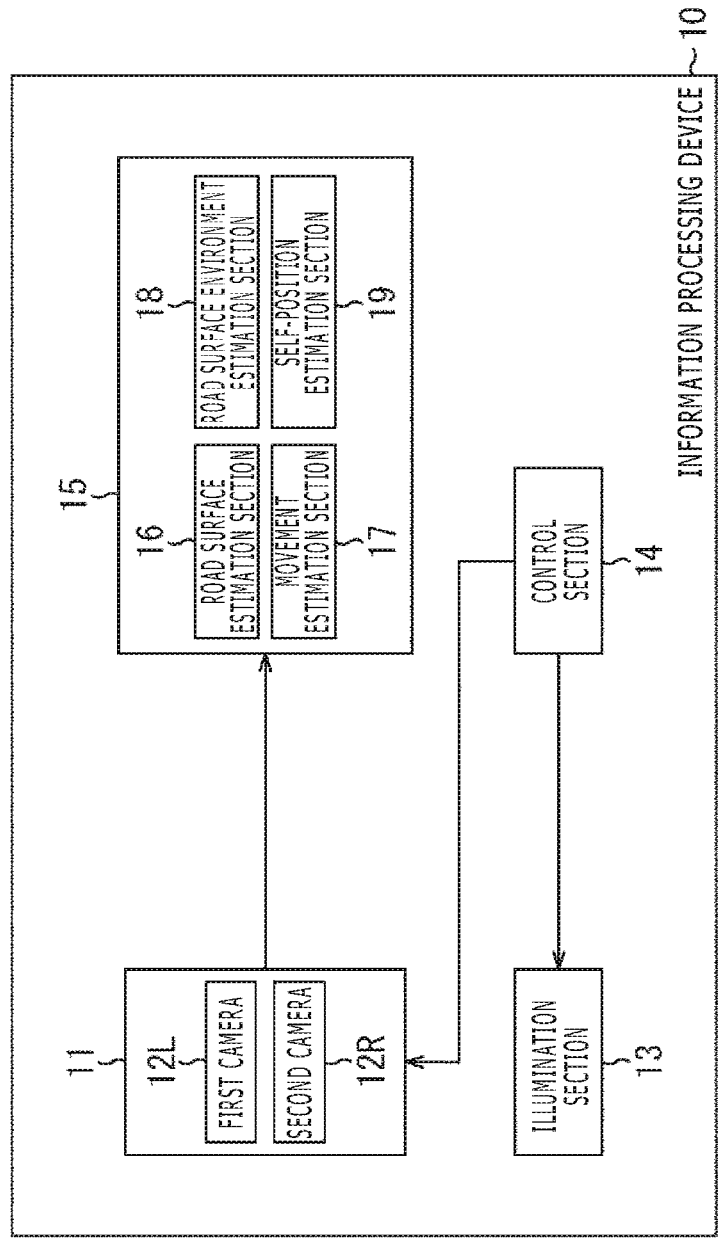
FIG. 1 is a block diagram illustrating a first exemplary configuration of an information processing device to which the present disclosure is applied.

First Exemplary Configuration of Information Processing Device According to Embodiment of Present Disclosure FIG. 1 illustrates a first exemplary configuration of the information processing device according to the embodiment of the present disclosure.

The information processing device 10 includes a downward imaging section 11, an illumination section 13, a control section 14, and an information processing section 15.

The downward imaging section 11 includes a pair of stereo cameras, namely, a first camera 12L and a second camera 12R (these cameras may be referred to also as the stereo cameras 12), captures a moving image at a predetermined frame rate to obtain chronological frame images, and outputs the chronological frame images to a subsequent stage. A frame image captured at time point t by the first camera 12L is hereinafter referred to as the first image (t), and a frame image captured at time t by the second camera 12R is hereinafter referred to as the second image (t).

Figure 2A:
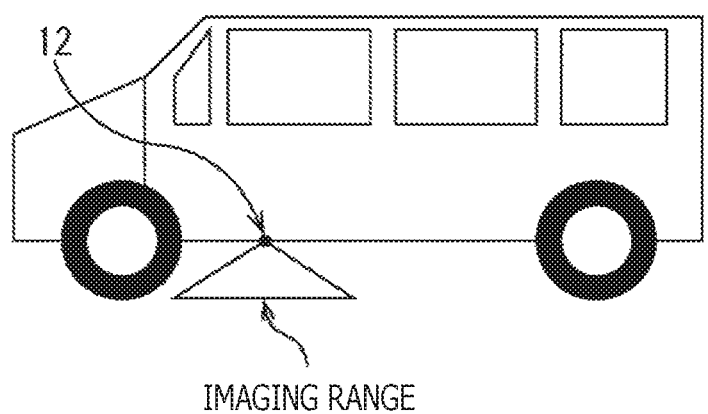
FIGS. 2A and 2B are diagrams illustrating an exemplary arrangement of stereo cameras included in a downward imaging section.
Figure 2B:
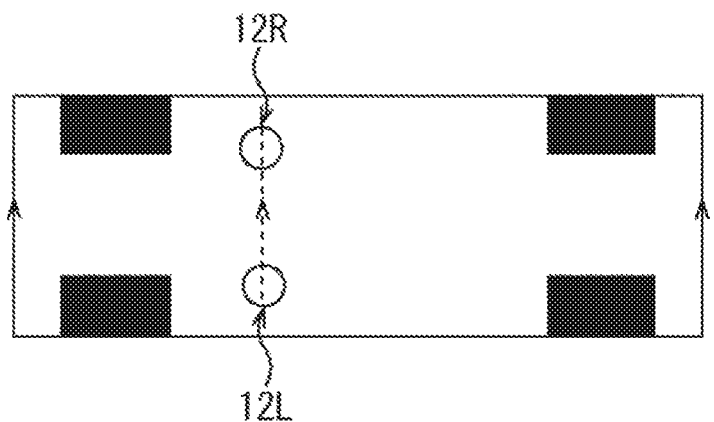
Figure 3A:
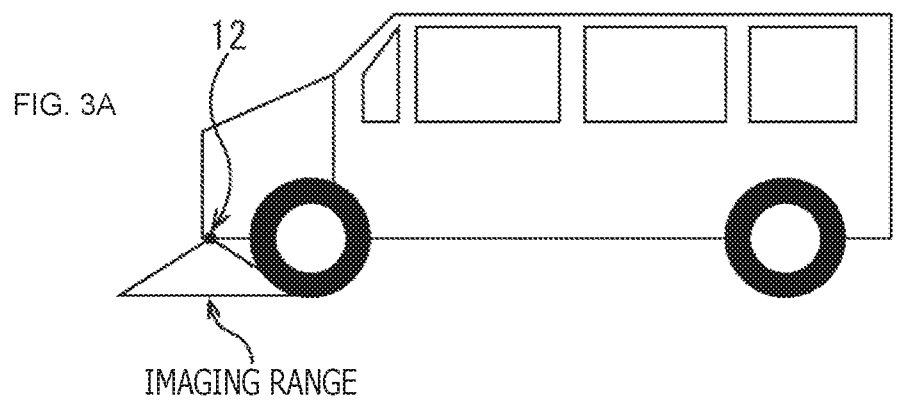
FIGS. 3A and 3B are diagrams illustrating another exemplary arrangement of stereo cameras included in the downward imaging section.
Figure 3B:
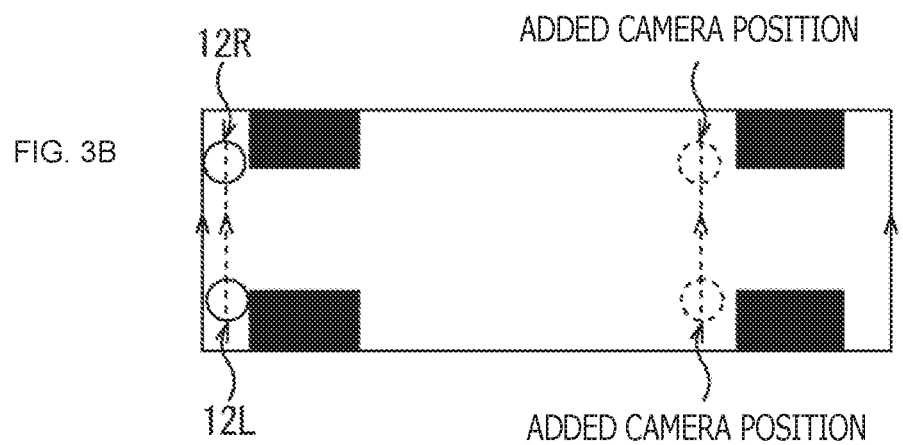

FIGS. 2A, 2B, 3A, and 3B illustrate exemplary arrangements, in an automobile, of the pair of stereo cameras 12 included in the downward imaging section 11. Depicted in FIGS. 2A and 3A are side views of the automobile. Depicted in FIGS. 2B and 3B are bottom views of the automobile.

As illustrated in FIG. 2A, the stereo cameras 12 are oriented downward such that a road surface is an imaging range without being affected by external light. Further, as illustrated in FIG. 2B, the stereo cameras 12 are disposed in parallel with the width direction of the automobile and spaced apart at a predetermined distance (parallax). Note that the arrangement of the stereo cameras 12 is not limited to the exemplary arrangement illustrated in FIGS. 2A and 2B. The stereo cameras 12 may be disposed at any position as far as an image of the road surface can be captured without being affected by external light. For example, the stereo cameras 12 may be disposed in front of front wheel tires as illustrated in FIGS. 3A and 3B. Alternatively, the stereo cameras 12 may be disposed behind rear wheel tires or attached to left and right door mirrors.

Further, two or more pairs of stereo cameras 12 may be included in the downward imaging section 11. In such an instance, as illustrated in FIGS. 3A and 3B, a pair of stereo cameras 12 is disposed on the front of the bottom surface of the automobile, and another pair of stereo cameras 12 is disposed on the rear of the bottom surface of the automobile. When the stereo cameras are disposed on the bottom surface of the automobile and spaced apart from each other as described above, later-described movement estimation can be achieved even when the automobile travels at a high speed.

Returning to FIG. 1, the illumination section 13 irradiates an imaging range of the downward imaging section 11 with illumination light. The control section 14 controls the downward imaging section 11 and the illumination section 13.

The information processing section 15 includes a road surface estimation section 16, a movement estimation section 17, a road surface environment estimation section 18, and a self-position estimation section 19.

The road surface estimation section 16 performs road surface estimation in accordance with a first image (t) and a second image (t) that are captured at the same time point t by the stereo cameras 12. The movement estimation section 17 performs movement estimation in accordance with a first image (t) (or a second image (t)) captured at a time point t and a first image (t−1) (or a second image (t−1)) captured at an immediately preceding time point t−1. Both of these estimation operations are described in detail below.

Figure 4:
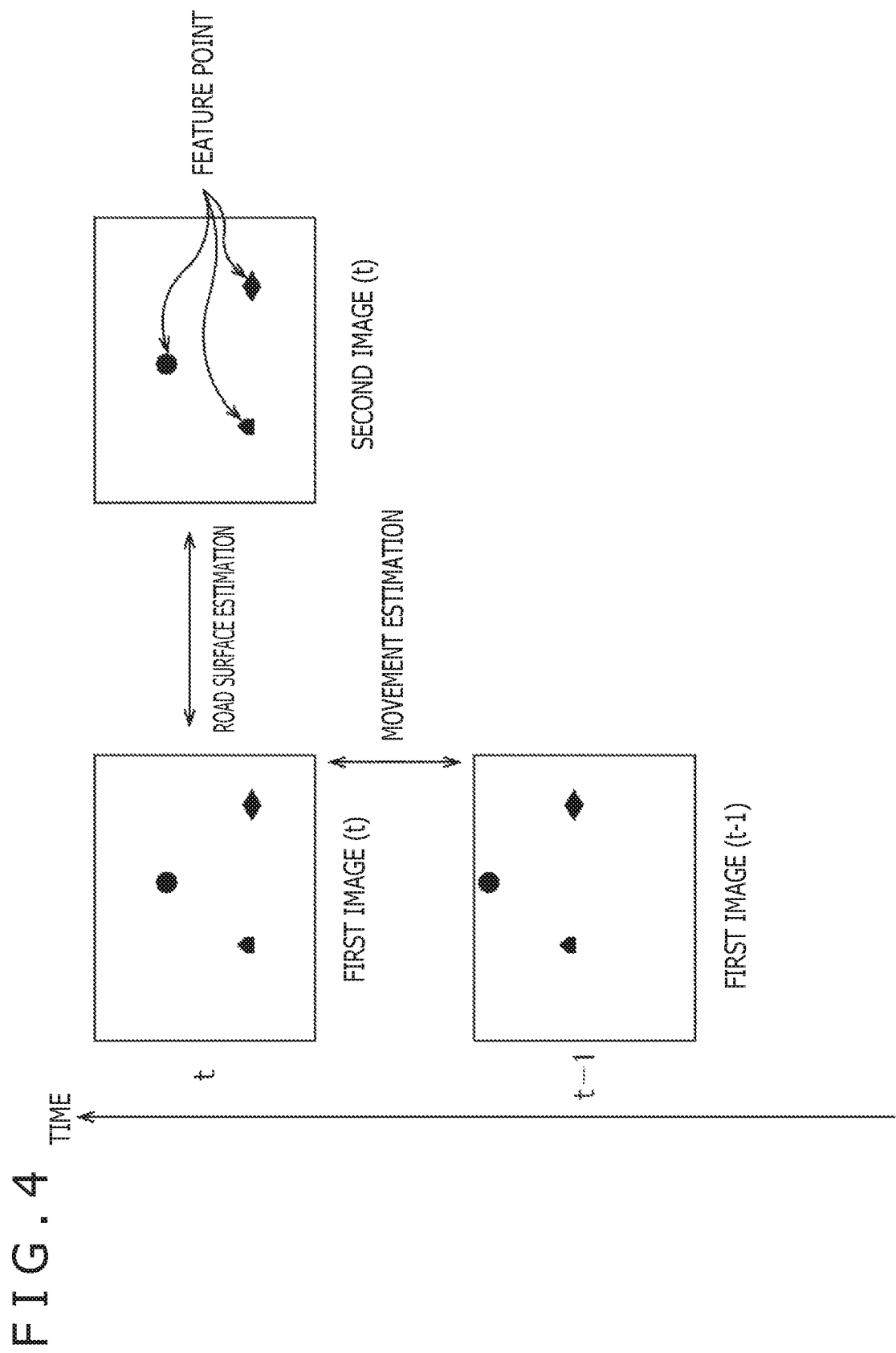
FIG. 4 is a diagram illustrating an overview of road surface estimation and movement estimation based on feature points.

FIG. 4 illustrates an overview of road surface estimation and movement estimation based on feature points.

As illustrated in FIG. 4, the road surface estimation is performed by detecting the same feature points in the first image (t) and the second image (t) and calculating, on the basis of the principle of triangulation, the distance between the feature points on a road surface and a baseline joining the stereo cameras of the downward imaging section 11 (hereinafter simply referred to the feature point-to-camera distance).

As illustrated in FIG. 4, the movement estimation is performed by detecting the same feature points in the first image (t) and the first image (t−1) and estimating the movement of an own moving object in accordance with the coordinate difference between the feature points in the two images. Note that the two images used for the movement estimation are not limited to the first image (t) and the first image (t−1), which are captured consecutively. The movement estimation may alternatively be performed by using, for example, the first image (t) and the first image (t−2) or the first image (t) and the first image (t−3).

Returning to FIG. 1, the road surface environment estimation section 18 estimates a road surface environment, that is, for example, the slope, irregularities, and slipperiness (p) of the road surface, in accordance with the result of road surface estimation (the feature point-to-camera distance). Note that the road surface estimation result may be used not only for road surface environment estimation but also for up-down vibration measurement of an automobile. The result of up-down vibration measurement may be used for vibration control.

The self-position estimation section 19 estimates a current self-position (the current position of the own moving object) by adding the estimated movement of the own moving object to a reference point, that is, a known location at a certain time point.

<First Self-Position Estimation Process by Information Processing Device 10>

Figure 5:
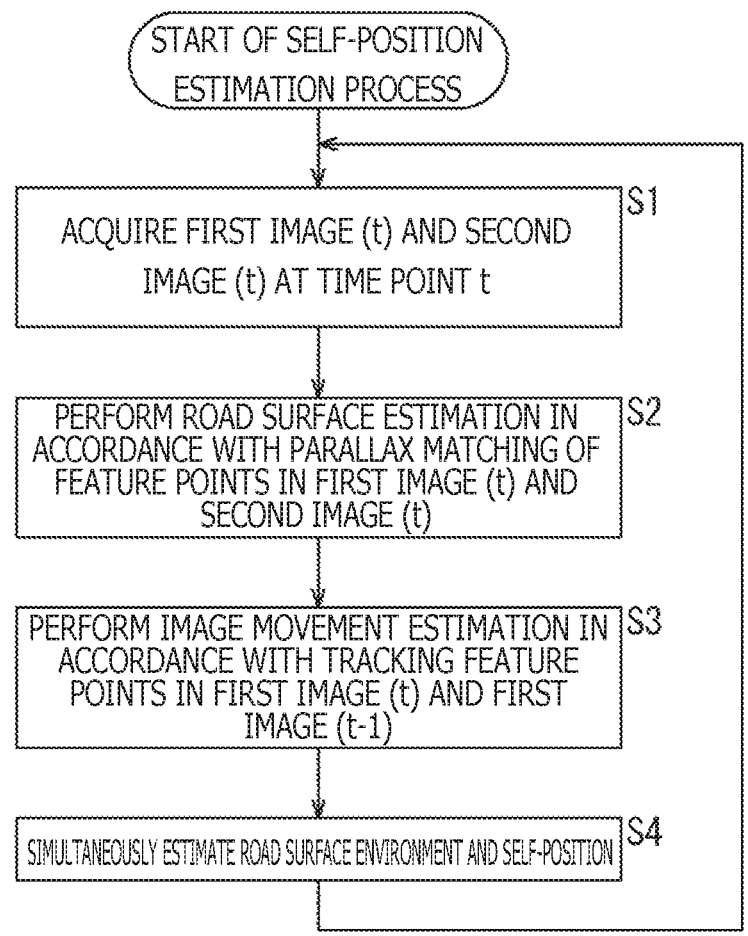
FIG. 5 is a flowchart illustrating a first self-position estimation process performed by the information processing device depicted in FIG. 1.

FIG. 5 is a flowchart illustrating a first self-position estimation process performed by the information processing device 10.

The first self-position estimation process is repeatedly performed at intervals equivalent to the frame rate of imaging by the stereo cameras 12 of the downward imaging section 11.

Further, it is assumed that the downward imaging section 11 uses a pair of stereo cameras 12 to capture a moving image in advance at a predetermined frame rate in order to obtain chronological frame images, and outputs the chronological frame images to the information processing section 15 in the output stage. It is also assumed that the self-position estimation section 19 acquires geographical coordinates of a location at a certain time point and identifies the current self-position (the position of the own moving object) by regarding such a location as a reference point.

In step S1, the road surface estimation section 16 of the information processing section 15 acquires the first image (t) and the second image (t), which are captured at time point t. In step S2, the road surface estimation section 16 detects feature points from the first image (t) and the second image (t), identifies the same feature points in these images, performs road surface estimation on the basis of parallax matching of these images, and calculates the feature point-to-camera distance.

In step S3, the movement estimation section 17 of the information processing section 15 detects the same feature points in the first image (t) captured at the time point t and the first image (t−1) captured at the immediately preceding time point t−1, and estimates the self-movement (the movement of an own automobile) in accordance with the coordinate difference between the feature points in the two images.

In step S4, the road surface environment estimation section 18 estimates the road surface environment, that is, for example, the slope and irregularities of the road surface, in accordance with the result of road surface estimation (the feature point-to-camera distance). At the same time, the self-position estimation section 19 estimates the current self-position by adding the currently estimated self-movement to a known reference point or to the previously estimated self-position. Subsequently, processing returns to step S1 so that steps S1 and beyond are repeated. The description of the first self-position estimation process performed by the information processing device 10 is now completed.

<Second Self-Position Estimation Process by Information Processing Device 10>

If it can be assumed that the road surface is a combination of planar triangles, the road surface estimation section 16 and the movement estimation section 17 are capable of performing road surface estimation and movement estimation by using a pixel gradient-based method.

FIG. 6 illustrates an overview of road surface estimation and movement estimation performed by using the pixel gradient-based method.

As illustrated in FIG. 6, the road surface estimation is performed by setting a specific region on a road surface (a region obtained by combining a plurality of triangles as depicted in FIG. 6) on a road surface, and directly estimating the planar shape of the specific region (the slope of each triangle) in accordance with the pixel gradient of the specific region in the first image (t) and in the second image (t).

As illustrated in FIG. 6, the movement estimation is performed by detecting the specific region in accordance with the image gradient of the specific region in the first image (t) and in the first image (t−1), and directly estimating the self-movement in accordance with the pixel gradient of the specific region in each of the two images.

Figure 7:
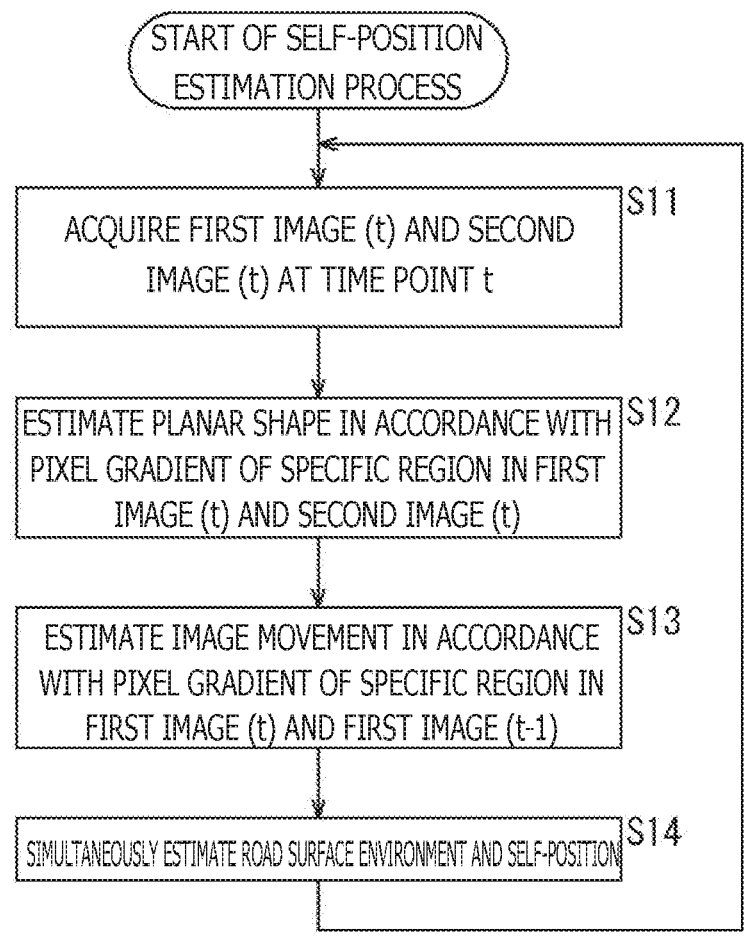
FIG. 7 is a flowchart illustrating a second self-position estimation process performed by the information processing device depicted in FIG. 1.

FIG. 7 is a flowchart illustrating a second self-position estimation process that is performed by the information processing device 10 in order to achieve road surface estimation and movement estimation by using the pixel gradient-based method.

The second self-position estimation process is repeatedly performed at intervals equivalent to the frame rate of imaging by the stereo cameras 12 of the downward imaging section 11.

Further, it is assumed that the road surface on which an automobile travels can be expressed by a polygon model including planar surfaces, and that the downward imaging section 11 uses a pair of stereo cameras 12 to capture, in advance, a moving image of a specific region set on the road surface at a predetermined frame rate in order to obtain chronological frame images, and outputs the chronological frame images to the information processing section 15 in the output stage. It is also assumed that the self-position estimation section 19 acquires geographical coordinates of a location at a certain time point and identifies the current self-position by regarding such a location as a reference point.

In step S11, the road surface estimation section 16 of the information processing section 15 acquires the first image (t) and the second image (t), which are captured at time point t. In step S12, the road surface estimation section 16 directly estimates the planar shape of the specific region in accordance with the pixel gradient of the specific region in each of the first image (t) and the second image (t).

In step S13, the movement estimation section 17 of the information processing section 15 directly estimates the self-movement (the movement of the own moving object) in accordance with the pixel gradient of the specific region in each of the first image (t) and the first image (t−1) captured at the immediately preceding time point t−1.

In step S14, the road surface environment estimation section 18 estimates the road surface environment, that is, for example, the slope and irregularities of the road surface, in accordance with the estimated planar shape of the specific region. At the same time, the self-position estimation section 19 estimates the current self-position by adding the currently estimated self-movement to a known reference point or to the previously estimated self-position. Subsequently, processing returns to step S11 so that steps S11 and beyond are repeated. The description of the second self-position estimation process performed by the information processing device 10 is now completed.

Figure 8:
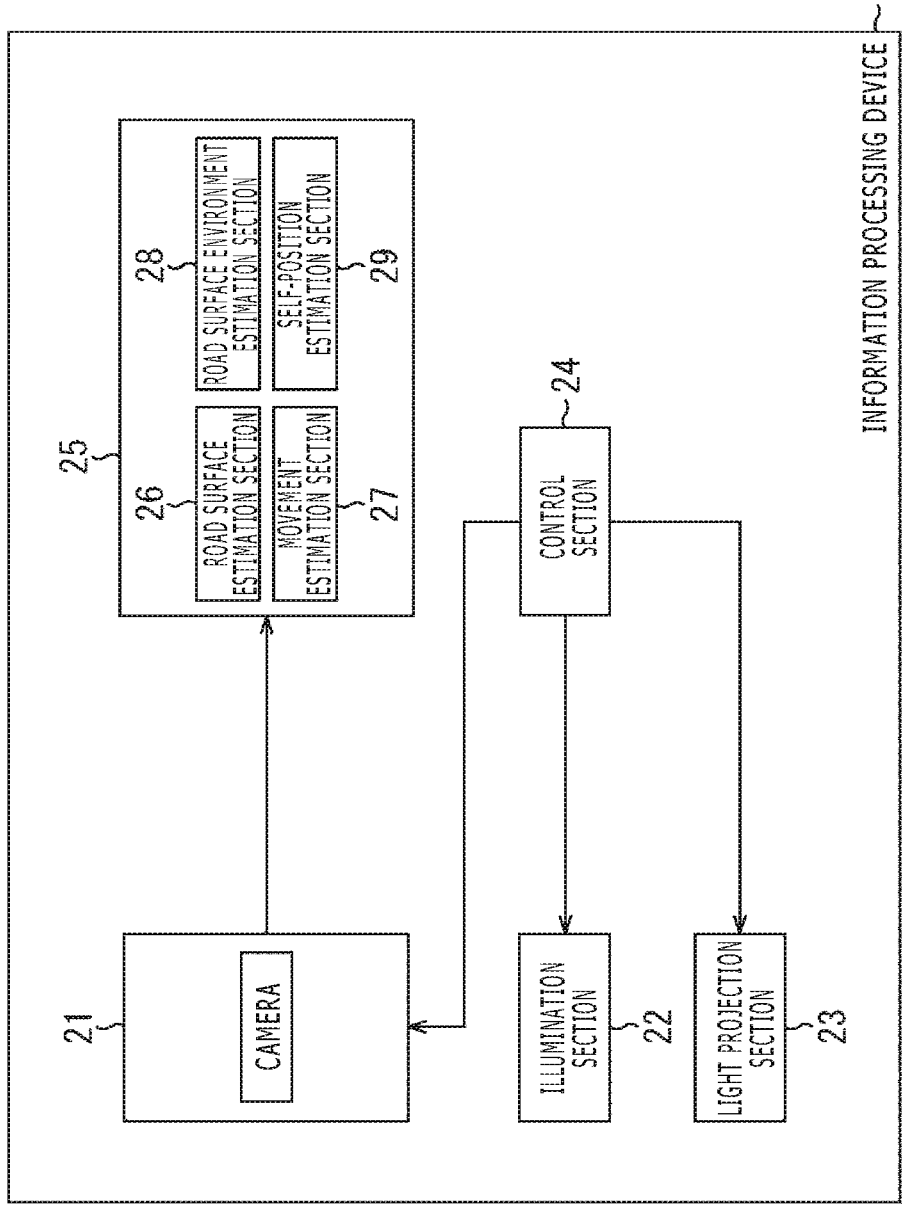
FIG. 8 is a block diagram illustrating a second exemplary configuration of the information processing device to which the present disclosure is applied.

Second Exemplary Configuration of Information Processing Device According to Embodiment of Present Disclosure FIG. 8 illustrates a second exemplary configuration of the information processing device according to the embodiment of the present disclosure.

This information processing device 20 includes a downward imaging section 21, an illumination section 22, a light projection section 23, a control section 24, and an information processing section 25.

The downward imaging section 21 includes a camera. The camera is mounted on the bottom of a moving object (e.g., an automobile) and oriented downward such that a road surface is an imaging range without being affected by external light. The downward imaging section 21 captures a moving image at a predetermined frame rate to obtain chronological frame images, and outputs the chronological frame images to a subsequent stage. A frame image captured at time point t by the camera of the downward imaging section 21 is hereinafter referred to as the image (t).

The illumination section 22 irradiates an imaging range of the downward imaging section 21 with illumination light. The light projection section 23 projects a texture pattern (structured light) onto the imaging range of the downward imaging section 21. Note that the illumination section 22 may be integral with the light projection section 23. Further, if adequate illuminance is obtained for capturing an image of feature points that may exist within the imaging range of the road surface when the texture pattern is projected onto the imaging range, the illumination light need not be irradiated. The control section 24 controls the downward imaging section 21, the illumination section 22, and the light projection section 23.

The information processing section 25 includes a road surface estimation section 26, a movement estimation section 27, a road surface environment estimation section 28, and a self-position estimation section 29.

The road surface estimation section 26 performs road surface estimation in accordance with the image (t) representing the road surface irradiated with the texture pattern. Note that a ToF (Time of Flight) sensor for irradiating the road surface with laser light and measuring the distance to the road surface in accordance with the time required for the laser light to bounce back may be used instead of the light projection section 23 and the road surface estimation section 26.

The movement estimation section 27 performs movement estimation by tracking the same feature points in a first image (t) (or a second image (t)) captured at a time point t and a first image (t−1) (or a second image (t−1)) captured at an immediately preceding time point t−1.

The road surface environment estimation section 28 estimates the road surface environment, that is, for example, the slope and irregularities of the road surface, in accordance with the result of road surface estimation (road surface-to-camera distance).

The self-position estimation section 29 estimates the current self-position by adding the estimated self-movement to a reference point, that is, a known location at a certain time point.

<Self-Position Estimation Process by Information Processing Device 20>

Figure 9:
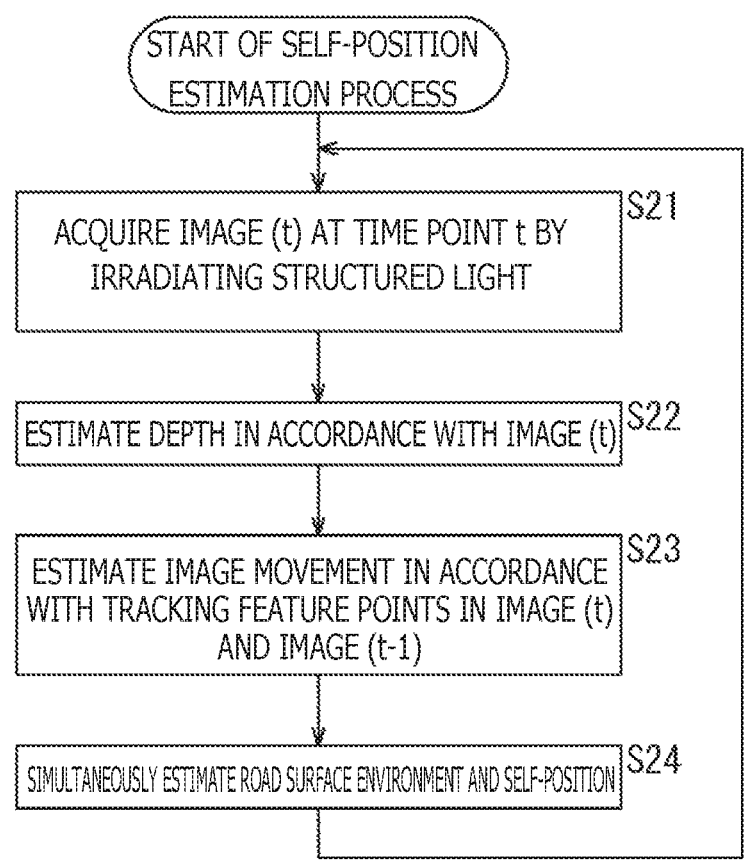
FIG. 9 is a flowchart illustrating a self-position estimation process performed by the information processing device depicted in FIG. 8.

FIG. 9 is a flowchart illustrating a self-position estimation process performed by the information processing device 20.

This self-position estimation process is repeatedly performed at intervals equivalent to the frame rate of imaging by the downward imaging section 21.

Further, it is assumed that the downward imaging section 21 captures, in advance, an image of the road surface irradiated with the texture pattern at a predetermined frame rate in order to obtain chronological frame images, and outputs the chronological frame images to the information processing section 25 in the output stage. It is also assumed that the self-position estimation section 29 acquires geographical coordinates of a location at a certain time point and identifies the current self-position by regarding such a location as a reference point.

In step S21, the road surface estimation section 26 of the information processing section 25 acquires an image (t) of the road surface irradiated with the texture pattern that is captured at time point t. In step S22, the road surface estimation section 26 calculates the road surface-to-camera distance in accordance with the shape of the texture pattern in the image (t).

In step S23, the movement estimation section 27 of the information processing section 25 detects the same feature points in the image (t) captured at a time point t and the image (t−1) captured at an immediately preceding time point t−1, and estimates the self-movement (the movement of the own moving object) in accordance with the coordinate difference between the feature points in the two images and with the road surface-to-camera distance calculated in step S22.

In step S24, the road surface environment estimation section 28 estimates the road environment, that is, for example, the slope, irregularities, and slipperiness of the road surface, in accordance with the result of road surface estimation (road surface-to-camera distance). At the same time, the self-position estimation section 29 estimates the current self-position by adding the currently estimated self-movement to a known reference point or to the previously estimated self-position. Subsequently, processing returns to step S21 so that steps S21 and beyond are repeated. The description of the self-position estimation process performed by the information processing device 20 is now completed.

The above-described information processing devices 10 and 20 are capable of accurately estimating the self-movement at internals equivalent to the frame rate of imaging. Therefore, the current self-position can be accurately estimated.

However, when, for example, an automobile is traveling on the road surface of a snowy or muddy road on which feature points cannot easily be detected or is traveling at a high speed that cannot be handled by the frame rate of the downward imaging section 11, the self-movement might not be estimated or the result of estimation might be in error. Therefore, if only road surface images are used, such errors will be accumulated so that the resulting estimated self-position deviates from the correct position.

Figure 10:
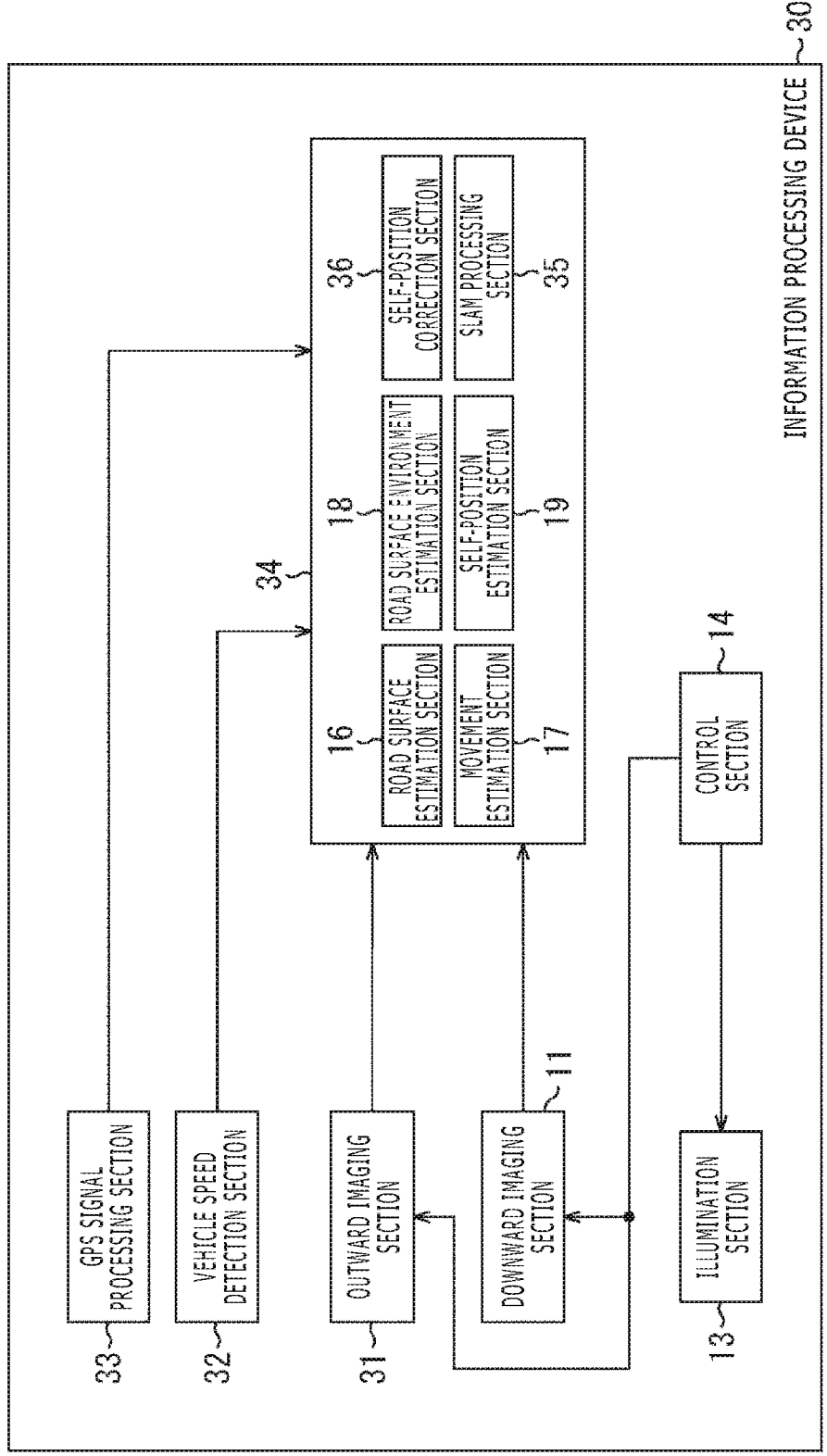
FIG. 10 is a block diagram illustrating a third exemplary configuration of the information processing device to which the present disclosure is applied.

Third Exemplary Configuration of Information Processing Device According to Embodiment of Present Disclosure FIG. 10 illustrates a third exemplary configuration of the information processing device according to the embodiment of the present disclosure that solves the problem where the resulting estimated self-position deviates from the correct position due to the accumulation of self-position estimation errors.

This information processing device 30 is obtained by adding an outward imaging section 31, a vehicle speed detection section 32, and a GPS processing section 33 to the information processing device 10 depicted in FIG. 1 and replacing the information processing section 15 of the information processing device 10 with an information processing section 34. The information processing device 30 is capable of correcting the result of self-position estimation based on images from the downward imaging section 11 in accordance, for example, with the result of self-position estimation based on images from the outward imaging section 31.

The information processing section 34, which is a replacement of the information processing section 15, is obtained by adding a SLAM processing section 35 and a correction section 36 to the information processing section 15, which is replaced by the information processing section 34. Note that components of the information processing device 30 that are identical with those of the information processing device 10 are designated by the same reference numerals as the corresponding elements and will not be redundantly described.

The outward imaging section 31 includes at least one camera that is attached to a moving object and oriented so as to capture an image of the surroundings. The image captured by the outward imaging section 31 is supplied to the SLAM processing section 35.

Figure 11:
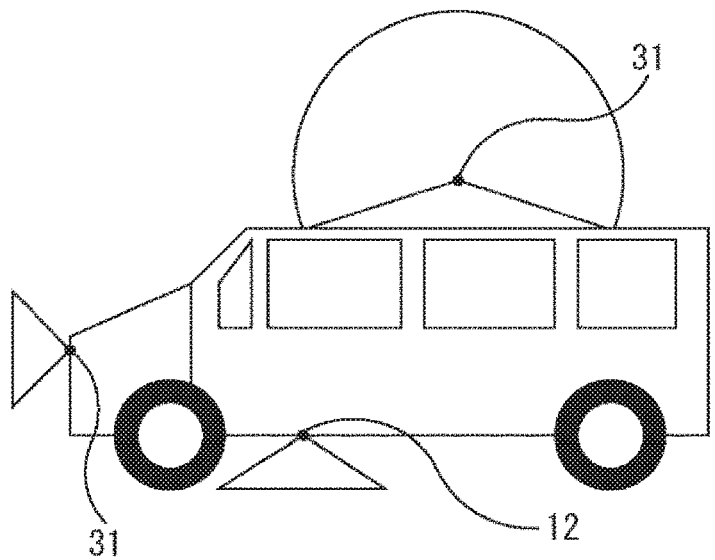
FIG. 11 is a diagram illustrating an exemplary arrangement of cameras included in an outward imaging section.

FIG. 11 illustrates an exemplary camera arrangement that is used when one or more cameras included in the outward imaging section 31 are attached to an automobile, that is, a moving object. A wide-angle camera or an all-around camera may be employed and oriented so as to capture an image, for example, of a forward, lateral, or rearward view from the automobile.

Returning to FIG. 10, the vehicle speed detection section 32 detects the traveling speed of the moving object in accordance with a vehicle speed pulse derived, for example, from the automobile. The GPS processing section 33 receives a GPS signal and identifies the self-position in accordance with the received GPS signal. The SLAM processing section 35 estimates the self-position by checking a database for images from the outward imaging section 31 that shows the surroundings of the automobile. The database may be incorporated in the SLAM processing section 35 or disposed in a server connectable through a communication network.

The correction section 36 corrects the result of self-position estimation by the self-position estimation section 19, which is based on images captured by the downward imaging section 11, by using the self-position identified by the GPS processing section 33 in accordance with the GPS signal and using the self-position estimated by the SLAM processing section 35.

<First Self-Position Correction Process by Correction Section 36>

Figure 12:
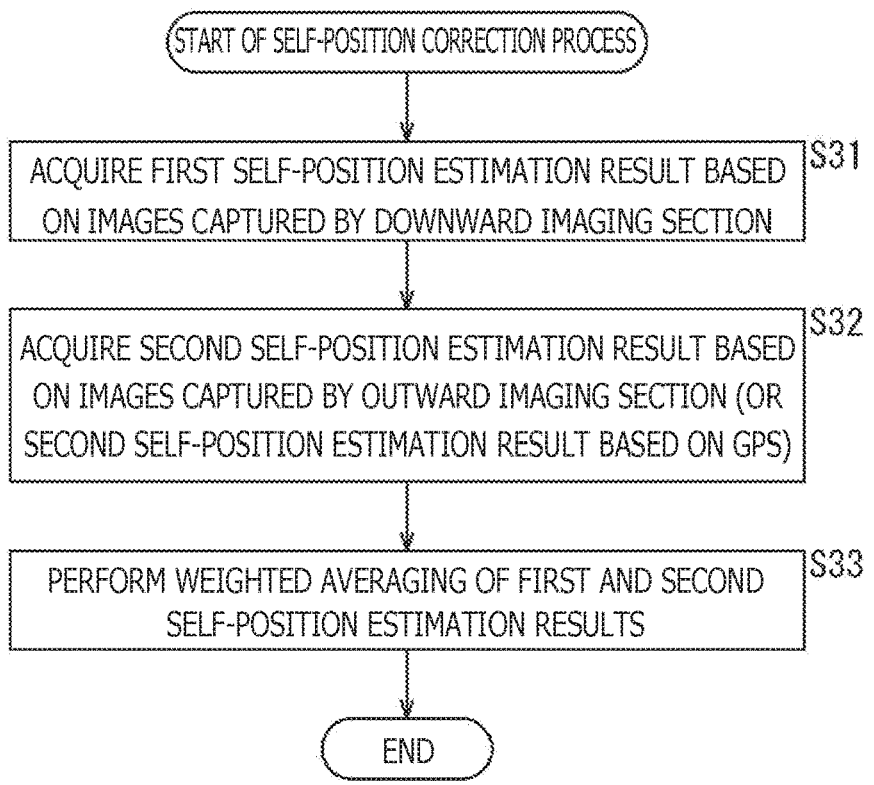
FIG. 12 is a flowchart illustrating a first self-position correction process performed by a correction section depicted in FIG. 10.

FIG. 12 is a flowchart illustrating a first self-position correction process performed by the correction section 36.

The first self-position correction process corrects a first self-position estimation result $wTc^G$ based on images from the downward imaging section 11 in accordance with a second self-position estimation result $wTc^O$ based on images from the outward imaging section 31.

In step S31, the correction section 36 acquires from the self-position estimation section 19 the first self-position estimation result $wTc^G$ based on images from the downward imaging section 11.

In step S32, the correction section 36 acquires from the SLAM processing section 35 the second self-position estimation result $wTc^O$ based on images from the outward imaging section 31.

In step S33, in accordance with Equation (1) below, the correction section 36 makes corrections by performing weighted averaging of the first self-position estimation result $wTc^G$ acquired in step S31 and the second self-position estimation result $wTc^O$ acquired in step S32, and acquires a corrected self-position wTc.

$$wTc = \alpha \times wTc^G + (1-\alpha) \times wTc^O \quad (1)$$

Here, $\alpha$ is a value that satisfies the relational expression $0<\alpha<1$. Note that the value of $\alpha$ may be adaptively set as is the case with the Kalman filter.

Note that a self-position $wTc^{GPS}$ identified by the GPS processing section 33 in accordance with a GPS signal may be used instead of the self-position estimation result $wTc^O$ based on images from the outward imaging section 31.

The first self-position correction process described above may be performed intermittently at predetermined intervals. When performed in such a manner, the first self-position correction process corrects the accumulation of errors in the self-position $wTc^G$ estimated on the basis of road surface images.

<Second Self-Position Correction Process by Correction Section 36>

Figure 13:
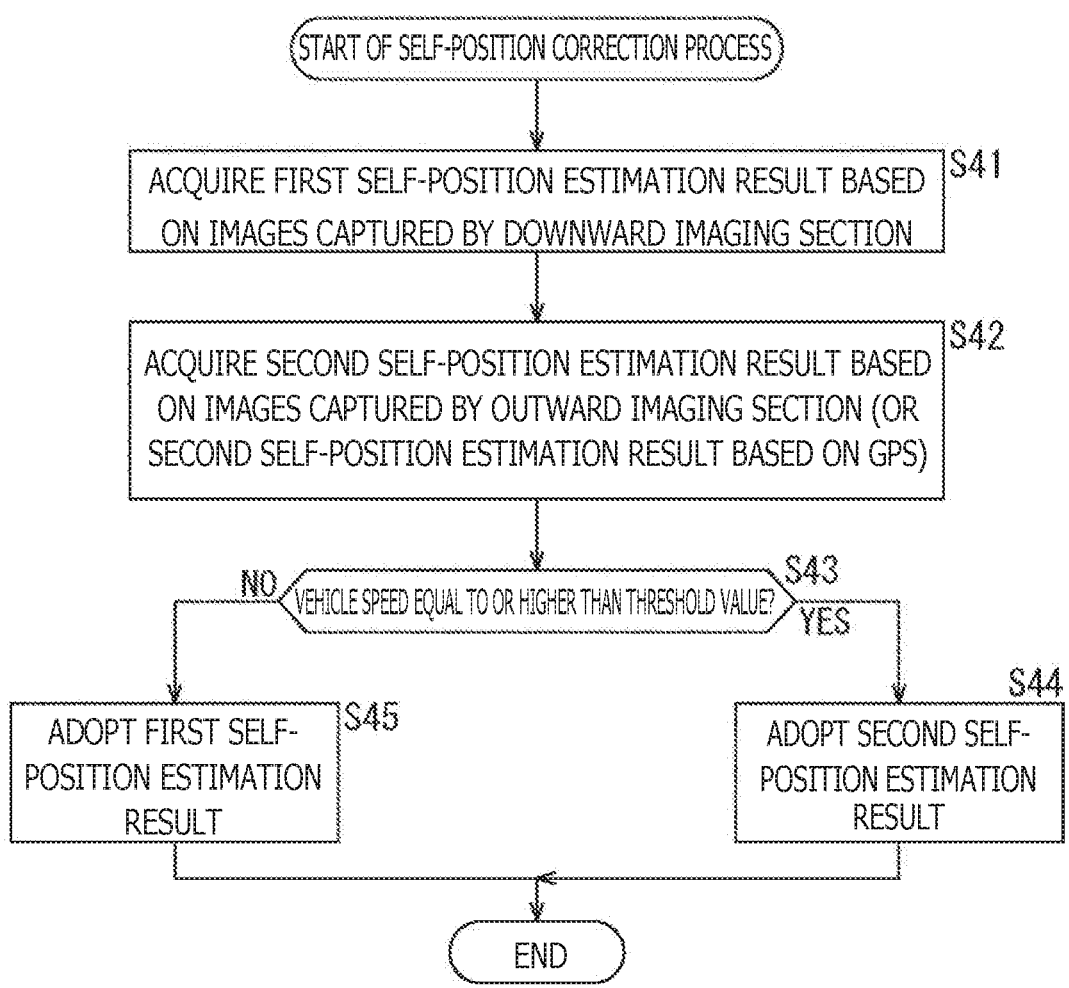
FIG. 13 is a flowchart illustrating a second self-position correction process performed by the correction section depicted in FIG. 10.

FIG. 13 is a flowchart illustrating a second self-position correction process performed by the correction section 36.

When the vehicle speed $v_t$ of an automobile is equal to or higher than a predetermined threshold value, the second self-position correction process adopts the second self-position estimation result $wTc^O$ based on images from the outward imaging section 31 instead of the first self-position estimation result $wTc^G$ based on images from the downward imaging section 11.

In step S41, the correction section 36 acquires from the self-position estimation section 19 the first self-position estimation result $wTc^G$ based on images from the downward imaging section 11.

In step S42, the correction section 36 acquires from the SLAM processing section 35 the second self-position estimation result $wTc^O$ based on images from the outward imaging section 31.

In step S43, the correction section 36 acquires the vehicle speed $v_t$ from the vehicle speed detection section 32, and determines whether the vehicle speed $v_t$ is equal to or higher than the predetermined threshold value.

If the vehicle speed $v_t$ is equal to or higher than the predetermined threshold value, it is conceivable that the first self-position estimation result $wTc^G$ is susceptible to error. Therefore, the correction section 36 proceeds to step S44 and adopts the second self-position estimation result $wTc^O$ as a final self-position estimation result wTc.

If, on the contrary, the vehicle speed $v_t$ is lower than the predetermined threshold value, it is conceivable that the first self-position estimation result $wTc^G$ is not susceptible to error. Therefore, the correction section 36 proceeds to step S45 and adopts the first self-position estimation result $wTc^G$ as the final self-position estimation result wTc.

Note that the self-position $wTc^{GPS}$ identified by the GPS processing section 33 in accordance with a GPS signal may be used instead of the self-position estimation result $wTc^O$ based on images from the outward imaging section 31.

The second self-position correction process described above may be repeated continuously. As a result, if the first self-position estimation result $wTc^G$ is in error, the second self-position estimation result $wTc^O$ may be adopted.

<Third Self-Position Correction Process by Correction Section 36>

Figure 14:
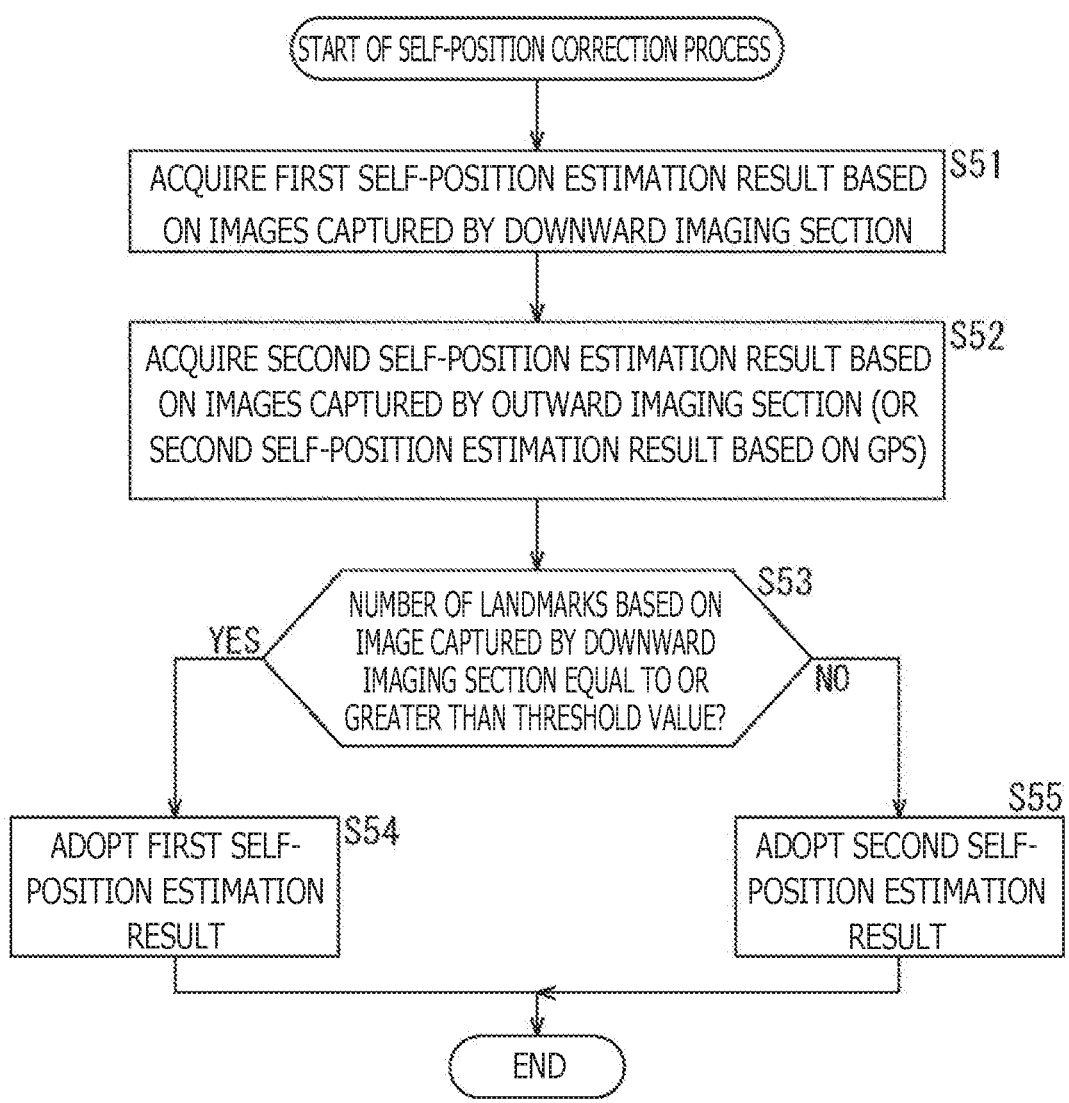
FIG. 14 is a flowchart illustrating a third self-position correction process performed by the correction section depicted in FIG. 10.

FIG. 14 is a flowchart illustrating a third self-position correction process performed by the correction section 36.

If the number $x_t$ of landmarks identified in the images from the downward imaging section 11 (feature points whose real-space coordinates are identified) is equal to or larger than a predetermined threshold value during the first self-position estimation process based on images from the downward imaging section 11, the third self-position correction process adopts the second self-position estimation result $wTc^O$ based on images from the outward imaging section 31 instead of the first self-position estimation result $wTc^G$ based on images from the downward imaging section 11.

In step S51, the correction section 36 acquires from the self-position estimation section 19 the first self-position estimation result $wTc^G$ based on images from the downward imaging section 11.

In step S52, the correction section 36 acquires from the SLAM processing section 35 the second self-position estimation result $wTc^O$ based on images from the outward imaging section 31.

In step S53, the correction section 36 acquires from the road surface environment estimation section 18 the number $x_t$ of landmarks identified in the images from the downward imaging section 11, and determines whether the number $x_t$ of landmarks is equal to or larger than the predetermined threshold value.

If the number $x_t$ of landmarks is equal to or larger than the predetermined threshold value, it is conceivable that the first self-position estimation result $wTc^G$ is not susceptible to error. Therefore, the correction section 36 proceeds to step S54 and adopts the first self-position estimation result $wTc^G$ as the final self-position estimation result $wTc$.

If, on the contrary, the number $x_t$ of landmarks is smaller than the predetermined threshold value, it is conceivable that the first self-position estimation result $wTc^G$ is susceptible to error. Therefore, the correction section 36 proceeds to step S55 and adopts the second self-position estimation result $wTc^O$ as the final self-position estimation result $wTc$.

Note that the self-position $wTc^{GPS}$ identified by the GPS processing section 33 in accordance with a GPS signal may be used instead of the self-position estimation result $wTc^O$ based on images from the outward imaging section 31.

The third self-position correction process described above may be repeated continuously. As a result, if the first self-position estimation result $wTc^G$ is in error, the second self-position estimation result $wTc^O$ may be adopted.

CONCLUSION

As described above, the information processing devices 10, 20, and 30 are capable of accurately and continuously estimating the self-movement and the current self-position.

Further, even if the estimated self-movement and self-position are in error, the information processing device 30 is capable of correcting such errors without allowing them to accumulate.

A series of processes to be performed by the information processing section 15 in the information processing device 10, the information processing section 25 in the information processing device 20, and the information processing section 34 in the information processing device 30 may be executed by hardware or by software. When the series of processes is to be executed by software, a program forming the software is installed in a computer. The computer may be, for example, a computer built in dedicated hardware or a general-purpose personal computer or other computer capable of executing various functions with various programs installed.

FIG. 15 is a block diagram illustrating an exemplary hardware configuration of a computer that executes a program to perform the above-described series of processes.

In the computer 100, a CPU (Central Processing Unit) 101, a ROM (Read Only Memory) 102, and a RAM (Random Access Memory) 103 are interconnected by a bus 104.

The bus 104 is further connected to an input/output interface 105. The input/output interface 105 is connected to an input section 106, an output section 107, a storage section 108, a communication section 109, and a drive 110.

The input section 106 is formed, for example, of a keyboard, a mouse, and a microphone. The output section 107 is formed, for example, of a display and a speaker. The storage section 108 is formed, for example, of a hard disk and a nonvolatile memory. The communication section 109 is formed, for example, of a network interface. The drive 110 drives a magnetic disk, an optical disk, a magneto-optical disk, or a removable medium 111 such as a semiconductor memory.

In the computer 100 configured as described above, the above-described series of processes are performed by allowing the CPU 101 to load a program stored, for example, in the storage section 108 into the RAM 103 through the input/output interface 105 and the bus 104 and execute the loaded program.

Note that programs to be executed by the computer 100 may be processed chronologically in the order described in this document, in a parallel manner, or at an appropriate time point in response, for example, to call-up.

Note that the present disclosure is not limited to the foregoing embodiment. Various changes and modifications can be made without departing from the spirit of present disclosure.

The present disclosure may adopt the following configurations.

(1) An information processing device including:
a downward imaging section that is disposed on the bottom of a moving object traveling on a road surface and captures an image of the road surface; and
a movement estimation section that estimates the movement of the moving object in accordance with a plurality of images representing the road surface and captured at different time points by the downward imaging section.

(2) The information processing device as described in (1) above, further including:
a road surface estimation section that estimates the distance to the road surface.

(3) The information processing device as described in (2) above, in which the downward imaging section includes stereo cameras, and the road surface estimation section estimates the distance to the road surface in accordance with a pair of images representing the road surface and captured at the same time point by the stereo cameras.

(4) The information processing device as described in (2) above, in which the road surface estimation section includes a ToF sensor.

(5) The information processing device as described in (2) above, further including:
a light projection section that projects a texture pattern onto the road surface;
in which the road surface estimation section estimates the distance to the road surface in accordance with an image of the texture pattern projected onto the road surface imaged by the downward imaging section.

(6) The information processing device as described in (5) above, in which the light transmitting section doubles as an illumination section that illuminates the imaging range of the downward imaging section.

(7) The information processing device as described in any one of (1) to (5) above, further including:
an illumination section that illuminates the imaging range of the downward imaging section.

(8) The information processing device as described in any one of (1) to (7) above, further including:
a first self-position estimation section that estimates the self-position of the moving object in accordance with the movement of the moving object that is estimated by the movement estimation section.

(9) The information processing device as described in any one of (1) to (8) above, further including:
an outward imaging section that is disposed on a moving object traveling on a road surface and captures an image of the surroundings of the moving object; and
a second self-position estimation section that estimates the self-position of the moving object in accordance with the image of the surroundings of the moving object that is captured by the outward imaging section.

(10) The information processing device as described in (9) above, further including:

a correction section that corrects a first self-position estimated by the first self-position estimation section by using a second self-position estimated by the second self-position estimation section.

(11) The information processing device as described in (10) above, in which the correction section performs weighted averaging of the first self-position estimated by the first self-position estimation section and the second self-position estimated by the second self-position estimation section.

(12) The information processing device as described in (10) above, in which the correction section adopts, in accordance with the vehicle speed of the moving object, the second self-position estimated by the second self-position estimation section instead of the first self-position estimated by the first self-position estimation section.

(13) The information processing device as described in (10) above, in which the correction section adopts, in accordance with the number of landmarks derived from the image of the road surface that is captured by the downward imaging section, the second self-position estimated by the second self-position estimation section instead of the first self-position estimated by the first self-position estimation section.

(14) An information processing method that is used in an information processing device including a downward imaging section and a movement estimation section, the downward imaging section being disposed on the bottom of a moving object traveling on a road surface and captures an image of the road surface, the movement estimation section estimating the movement of the moving object in accordance with a plurality of road surface images that are captured at different time points by the downward imaging section, the information processing method including:

an acquisition step of acquiring, by the movement estimation section, the image of the road surface that is captured by the downward imaging section; and a movement estimation step of estimating, by the movement estimation section, the movement of the moving object in accordance with a plurality of acquired images representing the road surface and captured at different time points.

(15) A program that controls an information processing device including a downward imaging section and a movement estimation section, the downward imaging section being disposed on the bottom of a moving object traveling on a road surface and captures an image of the road surface, the movement estimation section estimating the movement of the moving object in accordance with a plurality of images representing the road surface and captured at different time points by the downward imaging section, the program causing a computer in the information processing device to perform a process including:

an acquisition step of acquiring the image of the road surface that is captured by the downward imaging section; and a movement estimation step of estimating the movement of the moving object in accordance with the plurality of acquired road surface images that are captured at different time points.

REFERENCE SIGNS LIST

10 Information processing device
11 Downward imaging section
12 Stereo camera
13 Illumination section
14 Control section
15 Information processing section
16 Road surface estimation section
17 Movement estimation section
18 Road surface environment estimation section
19 Self-position estimation section
20 Information processing device
21 Downward imaging section
22 Illumination section
23 Light projection section
24 Control section
25 Information processing section
26 Road surface estimation section
27 Movement estimation section
28 Road surface environment estimation section
29 Self-position estimation section
30 Information processing device
31 Outward imaging section
32 Vehicle speed detection section
33 GPS processing section
34 Information processing section
35 SLAM processing section
36 Correction section
100 Computer
101 CPU

The invention claimed is:

1. An information processing device; comprising:
a downward imaging section on a bottom of a moving object, wherein
the moving object is movable on a road surface; and
the downward imaging section is configured to capture a plurality of images of the road surface at different time points;
a movement estimation section configured to estimate movement of the moving object based on the plurality of images;
a road surface estimation section configured to estimate a distance from the downward imaging section to the road surface;
a first self-position estimation section configured to estimate a first self-position of the moving object based on the estimated movement of the moving object;
an outward imaging section on the moving object,
wherein the outward imaging section is configured to capture an image of surroundings of the moving object;
a second self-position estimation section configured to estimate a second self-position of the moving object based on the image of the surroundings of the moving object; and
a correction section configured to correct the first self-position based on the second self-position.

2. The information processing device according to claim 1, wherein
the downward imaging section includes stereo cameras configured to capture a pair of images of the road surface at a same time point, and
the road surface estimation section is further configured to estimate the distance to the road surface based on the pair of images of the road surface.

3. The information processing device according to claim 1, wherein the road surface estimation section includes a time of flight (ToF) sensor.

4. The information processing device according to claim 1, further comprising a light projection section configured to project a texture pattern onto the road surface, wherein
the downward imaging section is further configured to capture an image of the texture pattern, and
the road surface estimation section is further configured to estimate the distance to the road surface based on the image of the texture pattern.

5. The information processing device according to claim 4, wherein illumination of an imaging range of the downward imaging section is based on the projection of the texture pattern.

6. The information processing device according to claim 1, further comprising an illumination section configured to illuminate an imaging range of the downward imaging section.

7. The information processing device according to claim 1, wherein the correction section is further configured to compute weighted average of the first self-position and the second self-position.

8. The information processing device according to claim 1, wherein the correction section is further configured to adopt, based on a vehicle speed of the moving object, the second self-position instead of the first self-position.

9. The information processing device according to claim 1, wherein the correction section is further configured to adopt, based on a number of landmarks derived from the plurality of images of the road surface, the second self-position instead of the first self-position.

10. An information processing method, comprising:
in an information processing device that includes a downward imaging section, a road surface estimation section, a first self-position estimation section, an outward imaging section, a second self-position estimation section, a correction section, and a movement estimation section;
capturing, by the downward imaging section on a bottom of a moving object a plurality of images of a road surface at different time points,
wherein the moving object is movable on the road surface;
estimating, by the movement estimation section, movement of the moving object based on the plurality of images;
estimating, by the road surface estimation section, a distance from the downward imaging section to the road surface;
estimating, by the first self-position estimation section, a first self-position of the moving object based on the estimated movement of the moving object;
capturing, by the outward imaging section on the moving object, an image of surroundings of the moving object;
estimating, by the second self-position estimation section, a second self-position of the moving object based on the image of the surroundings of the moving object; and
correcting, by the correction section, the first self-position based on the second self-position.

11. A non-transitory computer-readable medium having stored thereon, computer-executable instructions, which when executed by an information processing device, cause the information processing device to execute operations, the operations comprising:
capturing, by a downward imaging section of the information processing device, a plurality of images of a road surface at different time points, wherein
the downward imaging section is on a bottom of a moving object, and
the moving object is movable on the road surface;
estimating, by a movement estimation section of the information processing device, movement of the moving object based on the plurality of images;
estimating, by a road surface estimation section of the information processing device, a distance from the downward imaging section to the road surface;
estimating, by a first self-position estimation section of the information processing device, a first self-position of the moving object based on the estimated movement of the moving object;
capturing, by an outward imaging section of the information processing device, an image of surroundings of the moving object,
wherein the outward imaging section is on the moving object;
estimating, by a second self-position estimation section of the information processing device, a second self-position of the moving object based on the image of the surroundings of the moving object; and
correcting, by a correction section of the information processing device, the first self-position based on the second self-position.

* * * * *